Dec. 22, 1931.  M. SCHNAIER  1,837,888
COUPLING
Filed Feb. 9, 1927

Inventor
Milton Schnaier
By his Attorneys
Dean, Fairbank, Obright & Hirsch

Patented Dec. 22, 1931

1,837,888

UNITED STATES PATENT OFFICE

MILTON SCHNAIER, OF NEW YORK, N. Y.

COUPLING

Application filed February 9, 1927. Serial No. 166,848.

My present invention relates to hose couplings, primarily to those employed to connect the flexible hose lengths for shower bath, shampoo and analagous fittings.

It is among the objects of the invention to provide a hose coupling of simple, inexpensive and rugged construction which can be applied without the use of a separate adapter to hose of various wall thicknesses, and which will in every case effect a thoroughly reliable and water-tight joint without the need for gasket material.

Among other objects are to provide a hose coupling of the type noted, which admits of application to and removal from the unfinished end of an ordinary length of hose by hand, and without the use of a tool, and which shall not thereby subject the hose to destructive torsional, shearing, gouging or cutting action.

Another object is to provide a coupling of the above character made up of a single pre-assembled metal unit, none of the constituent parts of which can become separated or lost, and which in use presents no protruding corners, pins, screws, or clamps apt to injure the user.

Figure 1:
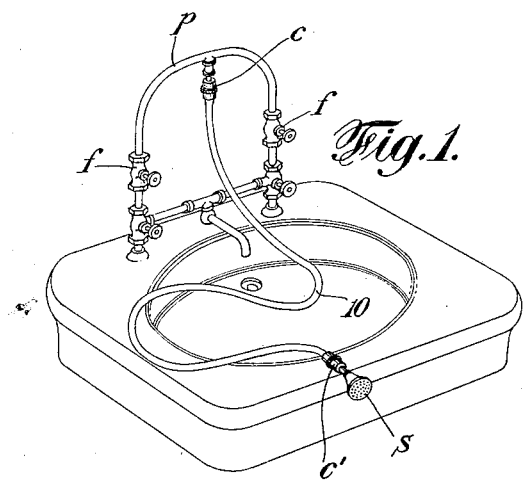
Figure 2:
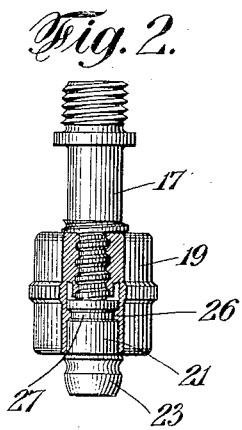
Figure 3:
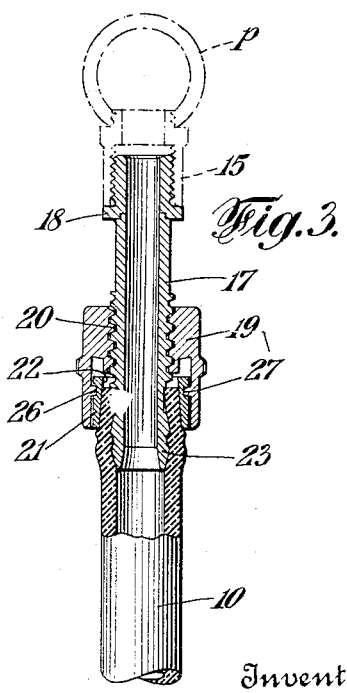

In the accompanying drawings, in which is shown one of the various embodiments of the several features of the invention, Fig. 1 is a perspective view on a small scale illustrating one application of the couping, Fig. 2 is an exterior view of the coupling with parts broken away, and Fig. 3 is a view in longitudinal cross-section of the coupling with the hose end applied thereto.

I have illustratively shown in Fig. 1, a sink of the type employed in barber shops for shampoos, illustrating the conventional mixing faucets $f$, and associated piping. One of the couplings C, made according to my invention mounts the inlet end of a hose 10 at the bridge pipe $p$ and a similar coupling C′, mounts the shampoo nozzle $s$ upon the outer end of hose 10.

In Fig. 3, my coupling is illustratively shown applied at the socket 15 in pipe $p$, shown in dot and dash lines. The coupling comprises a nozzle member 17 having a nipple 18 brazed thereto and removably threaded into socket 15, a coupling sleeve 19 tapped at one end for threaded mount at 20 upon the threaded shank 17 and a loose ferrule band 21 retained within the opposite end of the coupling sleeve. The inner bore of the ferrule band 21 is tapered inwardly as at 22. Instead of the threaded connection of the nozzle and the coupling sleeve, any equivalent sloping connection operating on the principle of the inclined plane could be employed.

The nozzle 17 has a conical enlargement 23 at the ferrule band extremity of the coupling sleeve for mounting the hose end. By merely turning the coupling sleeve manually upon the nozzle member 17, a mechanically secure, water-tight connection is established. In this operation the coupling sleeve with its ferrule band is drawn over the nozzle enlargement 23 over which the hose end has been previously spread. A frictional hold between the inner wall of the loose ferrule band and the outer wall of the hose promptly occurs and causes said ferrule band to substantially stand still with the nozzle and the hose while the coupling sleeve is rotated thereover. The ferrule band thus acts to guard the rubber hose end from frictional wear, in the process of tightening the coupling. By the threaded advance of the coupling sleeve, the ferrule band is thus wedged over the hose end to securely grip the latter over the enlargement 23 of the nozzle. The nozzle member and the ferrule band standing still as the coupling sleeve is turned, the sole strain upon the hose is a wedging or gripping strain tending to compress the wall of the hose between the enlargement 23 and the ferrule band 21. The inner taper of the ferrule not only contributes to the security of the wedging but is also important to render the coupling universally applicable to hoses of different wall thickness. The thinner the wall of the hose the farther the coupling sleeve will be advanced before effective gripping occurs. No twist is imparted to the hose, which is a feature of importance since rubber is apt to develop leak when subjected to torsion. The rubber wall is gripped so tightly about its periphery between band 21 and enlargement 23, that no leak can occur even under high water pressure. No separate gasket material is needed, and no reliance is had on a snug fit of thread 20 to render the joint water-tight.

While the ferrule band may be associated with the coupling sleeve in different relations, I prefer to form an interior bead 26 in the coupling sleeve and a corresponding peripheral groove 27 in the outer wall of the ferrule member 21. For facility of assembly the ferrule band is preferably made of original diameter so small as to clear the bead 26 when inserted into the coupling sleeve, said band being then swaged outwardly until its outer wall clears the inner wall of the grip sleeve slightly, and the groove 27 is closed over the bead 26. Thus the ferrule band is irremovably mounted within the coupling sleeve, but remains loose and freely rotatable therein yet avoiding any sharp edge likely to cut the hose.

In the present construction the maximum diameter of enlargement 23 exceeds the inner diameter of the thread 20, as does also the shoulder of nipple 18 so that the coupling made up of the nozzle member 17, and the coupling sleeve 19 which latter includes the loose ferrule band 21 is a pre-assembled article of manufacture, the constituent parts of which cannot become separated or disengaged. The nipples 18 brazed to the nozzles, will be of different sizes to accommodate different faucets or outlets, the other parts of the coupling being interchangeable.

A material advantage is gained by housing the rotatable ferrule within the coupling sleeve as opposed to rotatably connecting it to the end of the sleeve. Inasmuch as the ferrule is completely covered by the sleeve, it cannot be manually gripped and twisted either deliberately or casually. If the ferrule member projected from the sleeve and was accidentally grasped and turned, it would cause a relative rotation between the hose and one of its clamping elements and would result in bruising and twisting of the fairly fragile hose material.

My coupling when installed affords a neat and ornamental appearance and is devoid of corners, edges or protuberances likely to injure the user. It is applied with facility, without the need for tools or the exercise of skill, and can be removed with equal facility.

It will thus be seen that there is hereby described a device in which the several features of this invention are embodied, and which in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

I claim:

1. A hose coupling comprising a nozzle member, having an enlargement adjacent one end, a coupling sleeve encircling said member and having engagement therewith for longitudinal adjustment along said member, a ferrule band within said sleeve and wholly enveloped thereby the internal diameter of the ferrule band decreasing from its outer to its inner end, there being interengaging means to prevent separation of said ferrule and said sleeve.

2. A hose coupling comprising a nozzle member, having an enlargement adjacent one end, a coupling sleeve encircling said member and having engagement therewith for longitudinal adjustment along said member, and a ferrule band within said sleeve and wholly enveloped thereby, the internal diameter of the ferrule band decreasing from its outer to its inner end, and the interior thereof presenting a smooth surface, the exterior of said band likewise presenting a smooth surface except for an encircling groove therein, the sleeve having a portion projecting into said groove to retain the band in the interior of the sleeve.

Signed at New York, in the county of Bronx, and State of New York, this 7th day of February, A. D. 1927.

MILTON SCHNAIER.